(12) United States Patent
Kwon et al.

(10) Patent No.: US 6,504,325 B1
(45) Date of Patent: Jan. 7, 2003

(54) CATHODE RAY TUBE ASSEMBLY INCLUDING A SOCKET WITH A RESISTOR FOR CHANGING DYNAMIC FOCUS VOLTAGE

(75) Inventors: Yong-geol Kwon, Suwon (KR); Min-cheol Bae, Suwon (KR); In-kyu Park, Suwon (KR)

(73) Assignee: Samsung Display Devices Co., Ltd., Kyungki-do (KR)

( * ) Notice: Subject to any disclaimer, the term of this patent is extended or adjusted under 35 U.S.C. 154(b) by 507 days.

(21) Appl. No.: 09/080,723

(22) Filed: May 21, 1998

(30) Foreign Application Priority Data

Jun. 19, 1997 (KR) .............................. 97-25911

(51) Int. Cl.[7] .................................................. G09G 1/04
(52) U.S. Cl. ........................................ 315/382; 315/411
(58) Field of Search ................................. 315/382, 411

(56) References Cited

U.S. PATENT DOCUMENTS 4,527,229 A * 7/1985 Imamura et al. ............ 363/126
4,945,284 A    7/1990 Shimoma et al. ........... 313/414
5,519,290 A    5/1996 Sugawara et al. ......... 315/382.1

* cited by examiner

Primary Examiner—Constantine Hannaher
Assistant Examiner—Shun Lee
(74) Attorney, Agent, or Firm—Leydig, Voit & Mayer, Ltd.

(57) ABSTRACT

A cathode ray tube assembly includes a funnel having a neck, an electron gun having an electron emitter within the neck and having at least two focus electrodes for forming an electron lens for focusing and accelerating electron beams emitted from the electron emitter, lead pins extending through the neck and connected to the first and second focus electrodes, and a socket with pin connection terminals connectable to the lead pins; a voltage applying unit for applying an AC voltage to at least one of the focus electrodes through a lead pin connected to the focus electrode; and a voltage drop unit for reducing the AC voltage applied by the voltage applying unit to a second of the focus electrodes so that a reduced voltage is applied to a lead pin connected to the second focus electrode, the voltage drop unit being connected to the lead pins through pin connection terminals of the socket.

5 Claims, 4 Drawing Sheets

CATHODE RAY TUBE ASSEMBLY INCLUDING A SOCKET WITH A RESISTOR FOR CHANGING DYNAMIC FOCUS VOLTAGE

BACKGROUND OF THE INVENTION

1. Field of the Invention

The present invention relates to an electron gun device, and more particularly, to an electron gun device having an improved structure in which a voltage is applied to an electron gun installed on a neck portion of a cathode ray tube.

2. Description of the Related Art

In general, a color cathode ray tube using a triode is shown in FIG. 1. Referring to FIG. 1, the cathode ray tube comprises a panel 11 where a fluorescent film having a predetermined pattern is formed, and a funnel 13 sealingly combined with the panel 11 and including a neck portion 13a containing an electron gun 16 and a conical portion 13b where a deflection yoke 17 is installed. A lead pin 18 for applying a predetermined voltage to each electrode of the electron gun 16 is installed at the end of the neck portion 13a.

In the cathode ray tube, electron beams emitted from the electron gun 16 are selectively deflected by horizontal and vertical deflection magnetic fields formed by the deflection yoke 17 and excite the fluorescent material of the fluorescent film to form an image. Here, as shown in FIG. 2, when electron beams emitted from the electron gun 16 are deflected horizontally by the deflection yoke 17, a horizontal deflection magnetic field 22 of a pin-cushion type focuses the electron beams vertically, to horizontally elongate a cross section of the electron beams such as indicated by reference numeral 24.

Also, when electron beams are deflected vertically by the deflection yoke 17, a vertical deflection magnetic field 21 of a barrel type diverges the electron beams, to horizontally elongate a cross section to form electron beams such as indicated by reference numeral 25. This horizontally elongated distortion of an electron beam becomes more severe toward the peripheral portions of the panel 11 of FIG. 1, to form a halo effect 26a around a fine-focus portion 26b of the electron beams 26. Accordingly, the form of the electron beams landing on the fluorescent film is irregular and the focus characteristic becomes deteriorated, deteriorating the resolution of an image.

To solve these problems, an electron gun of a conventional dynamic focus type has been developed. A dynamic focus type electron gun includes a plurality of focus electrodes forming a quadruple lens between a final accelerating electrode and a focus electrode neighboring the final accelerating electrode or between the focus electrodes. Accordingly, a dynamic focus voltage synchronized with a deflection signal is applied to one or more focus electrodes forming the quadruple lens, to compensate for the distortion of the electron beam due to the non-uniform magnetic field of the deflection yoke.

One example of the dynamic focus type electron gun is disclosed in U.S. Pat. No. 4,945,284. The electron gun includes two or more focus electrodes electrically connected to a resistor for forming an electron lens, and an AC voltage is applied to one of the focus electrodes from a flyback transformer, i.e., a voltage supply source. Accordingly, the AC voltage reduced by the resistor is applied to other focus electrodes connected to the resistor.

Another example of the conventional dynamic focus type electron gun is disclosed in U.S. Pat. No. 5,519,290, as shown in FIG. 3. A cathode 'K' being an electron emitter, and first through sixth grids G1 through G6 for forming an electron lens are sequentially installed from the cathode 'K' as shown in FIG. 3. Each of the grids G1 through G6 include an electron beam passing hole serially arranged, and a vertically elongated electron beam passing hole 'H1' and a horizontally elongated electron beam passing hole 'H2' are formed in facing surfaces of the fifth and sixth grids G5 and G6, respectively. A dynamic focus voltage Vf synchronized with the deflection signal is applied to the third and sixth grids G3 and G6, and the voltage applied to the sixth grid G6 is effectively reduced by an electrostatic capacitance formed between the resistor 'R' and the fifth and sixth grids G5 and G6, to applying the reduced voltage to the fifth grid G5.

However, problems remain in the above-described dynamic focus type electron gun as follows.

First, since the electrostatic capacitance between the electrodes and the characteristics of the resistor connecting the fifth and sixth grids are liable to change during manufacturing of the electron gun, it is difficult to control the reduction of voltage and the focus characteristics becomes deteriorated. For example, an error in the spacing between the electrodes during the process of manufacturing the electron gun or a change in the electrode surface area during manufacturing of the electrode due to molding process causes a change in the electrostatic capacitance.

Second, the resistor connected to the fifth and sixth grids is in the sealed cathode ray tube. Accordingly, the resistor cannot be replaced and the resistance cannot be changed. For example, a high voltage may be applied to the grid during aging the cathode ray tube. Accordingly, due to a high voltage surge flowing through the resistor, the resistor can be fractured or the characteristics thereof may be spoilt. Also, driving voltages applied to the electron gun may be different according to the electrical appliances employing the electron gun, so that the resistance of the resistor need to be changed.

SUMMARY OF THE INVENTION

To solve the above problems, it is an object of the present invention to provide an electron gun device capable of changing the dynamic focus voltage applied to an electrode of the electron gun.

Accordingly, to achieve the above object of the present invention, there is provided an electron gun device including: an electron gun having an electron emitter, and at least two focus electrodes for forming an electron lens for focusing and accelerating electron beams emitted from the electron emitter, a voltage applying unit for applying an AC voltage to at least one of the focus electrodes through a lead pin connected to the focus electrode, and a voltage drop unit for reducing the AC voltage applied from the voltage applying unit to one of the focus electrodes to apply the reduced voltage to the lead pin connected to the other focus electrode.

The voltage applying unit includes: a rectifier for transforming alternating current to direct current; a condenser for removing high frequency noise of the rectified voltage; a voltage divider for dividing the voltage of the condenser; and a dynamic voltage generator for applying an AC voltage synchronized with a voltage applied to a deflection yoke to the divided voltage.

Also, the voltage drop unit includes a resistor reducing the voltage which is divided by the voltage divider and to which the AC voltage is applied by the dynamic voltage generator.

Preferably, the voltage drop unit includes a rheostat.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 4:
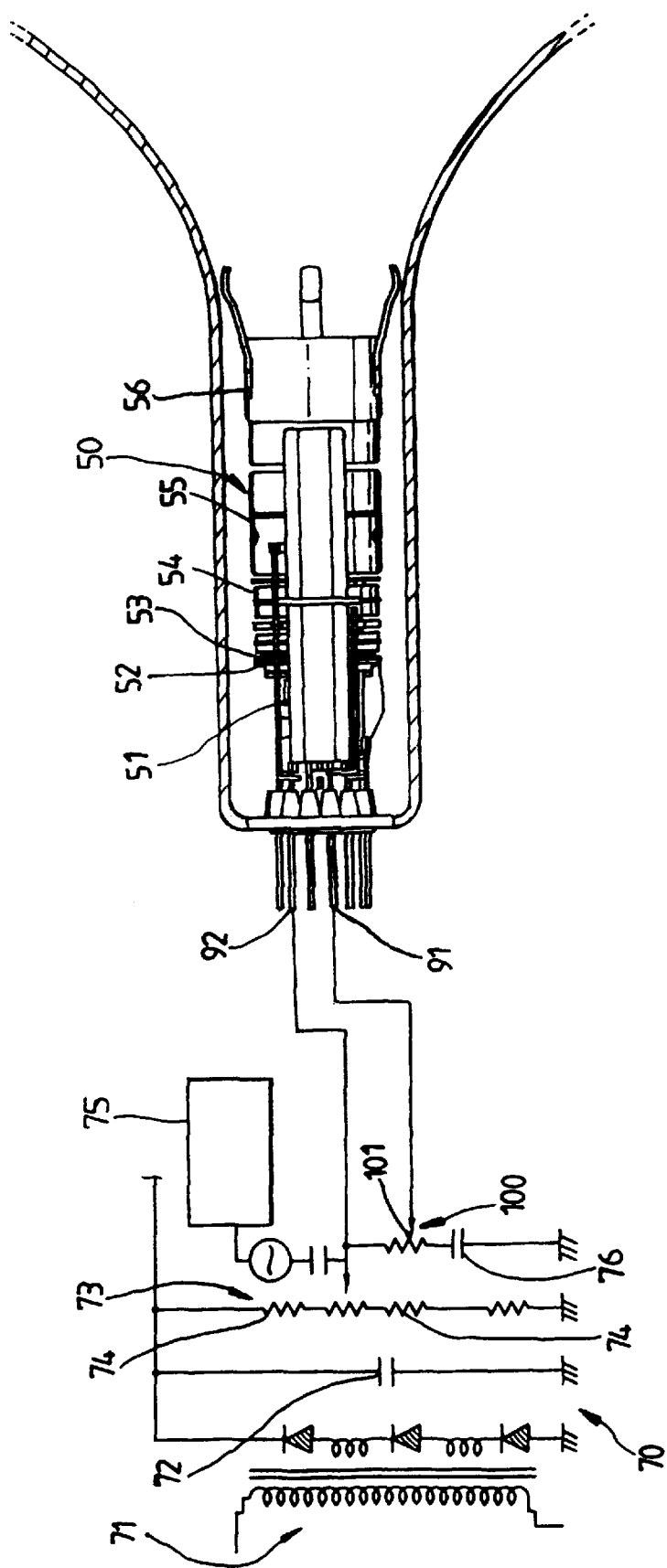
FIG. 4 is a sectional view of an electron gun according to the present invention.

An electron gun device of FIG. 4 according to the present invention includes an electron gun 50, a voltage applying unit 70 for applying an AC voltage to the electron gun, and a voltage drop unit 100 for reducing the AC voltage applied by the voltage applying unit 70 to apply a reduced AC voltage to the electron gun.

The electron gun 50 includes an electron emitter 51 in the form of a triode including a; control electrode 52 and, a screen electrode 53, first and second focus electrodes 54 and 55 forming a lens for focusing and accelerating electron beams emitted from the electron emitter 51, and a final accelerating electrode 56 forming a main lens, neighboring the second focus electrode 55.

The electrode emitter 51 includes three emitters (not shown) linearly arranged to emit three electron beams. Each of the electrodes has an electron beam passing hole (not shown) for passing the electron beams emitted from the respective electron emitter 51. In particular, electron beam passing holes (not shown) formed on facing surfaces of the first and second focus electrodes 54 and 55 are vertically and horizontally elongated, respectively, to form a quadrupole lens for application of a voltage. However, the form of the electron beam passing holes in the facing surfaces of the first and second focus electrodes 54 and 55 may be shaped in any form for forming the quadrupole lens.

Figure 1:
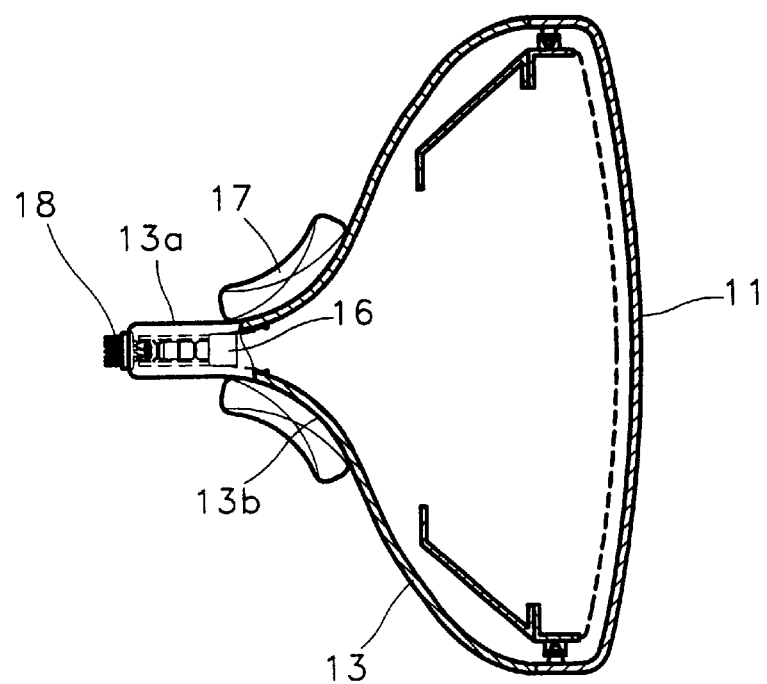
FIG. 1 is a sectional view of a conventional cathode ray tube.
Figure 2:
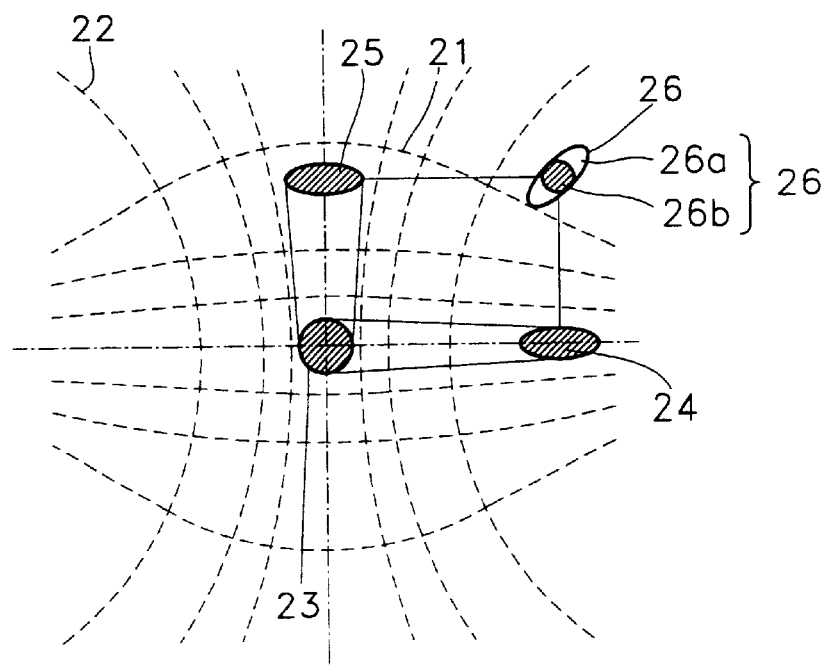
FIG. 2 shows a non-uniform magnetic field of a deflection yoke.
Figure 3:
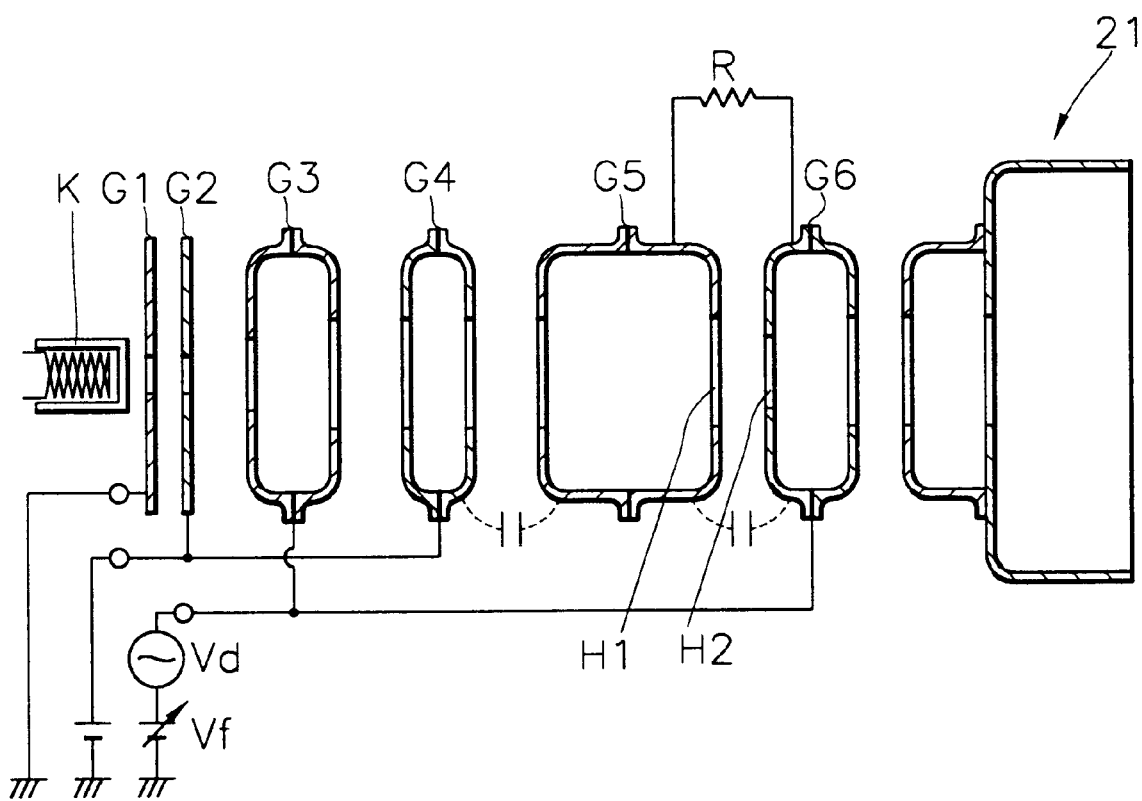
FIG. 3 is a sectional view of a conventional electron gun device in which a voltage is applied to an electrode.

The electron gun 50 is sealed in the neck portion 13a (see FIG. 1) of the cathode ray tube funnel 13, and predetermined voltages are applied to an electrode through a plurality of lead pins 91 and 92 connected to each of the electrodes of the electron gun. That is, the predetermined voltage is applied to a first focus electrode 54 through a first lead pin 91, and a predetermined voltage is applied to the second focus electrode 55 through a second lead pin 92.

The voltage applying unit 70 for applying a voltage to each of the electrodes and cathodes of the electron gun includes a rectifier comprised of a flyback transformer 71 for transforming alternating current to direct current, a condenser 72 for removing high-frequency noise from the rectified voltage, and a voltage divider 73 for dividing the voltage of the condenser 72. The voltage divider 73 includes a resistor 74 for reducing the voltage of the condenser 72 and applying the reduced voltage to each of the electrodes. The voltage reduced by the resistor 74 and applied to the first and second focus electrodes 54 and 55 is synchronized with a voltage applied from a dynamic voltage generator 75 to the deflection yoke 17 (see FIG. 1), which is an AC voltage of FIG. 5.

Figure 6:
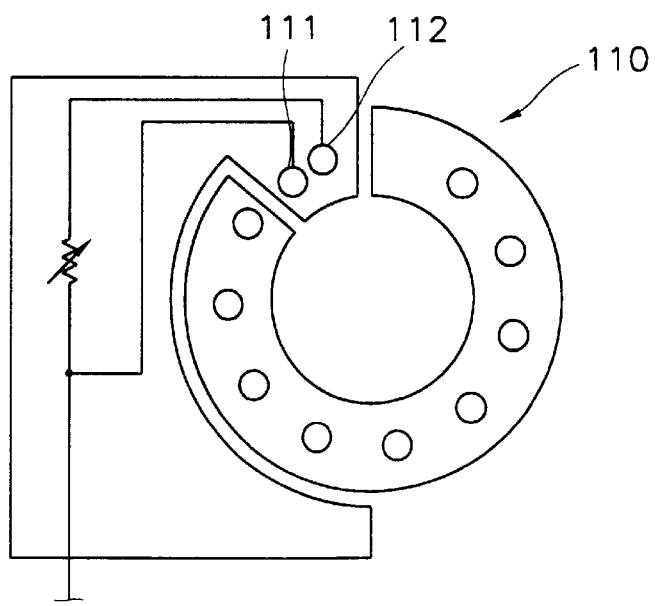
FIG. 6 shows another example of a voltage drop unit of the electron gun device according to the present invention.

A voltage of 6~7.5 KV, which is 24~30% of the voltage of the condenser 72 of approximately 25 KV is applied to the second lead pin 92 connected to the second focus electrode 55. Also, the AC voltage applied to the second focus electrode 55 is reduced by a resistor 101 a voltage drop unit 100 and applied to the first lead pin 91 connected to the first focus electrode 54. Here, preferably, the voltage drop unit 100 is a rheostat. Alternatively, as shown in FIG. 6, a resistor or a rheostat may be installed between first and second lead pin connection terminals 111 and 112 of a socket 110 which is combined with lead pins of the electron gun. Also, the resistor may be connected between the first and second lead pins 91 and 92.

Also, it is preferable that a condenser 76 is installed in a lead line connected to the first focus electrode 54 or the second focus electrode 55, as shown in FIG. 4, to protect the circuit from a discharge which may be generated between the electrodes during driving of the electron gun.

Referring to FIG. 4, when a predetermined voltage is applied to an electron emitter 51, each electrode and deflection yoke 17 (see FIG. 1) of an electron gun device according to the present invention, electron lenses are formed between the electrodes. Particularly, a dynamic quadrupole lens is formed between the first and second focus electrodes 54 and 55, and a main lens is formed between the second focus electrode 55 and the final accelerating electrode 56. Here, a parabolic AC focus voltage of shown in FIG. 5 and synchronized with the deflection signal is applied from the voltage applying unit 70 to the second focus electrode 55 through the second lead pin 92, and the AC dynamic focus voltage, reduced by the resistor 101, is applied to the first focus electrode 54 through the first lead pin 91.

The effect of the AC voltage reduced by the resistor can be calculated by the following expression:

$$\delta d = a \ln\{(h/V)*(1/f)*(1/R)\}$$

Here, $\delta d$ represents the reduced amount of a waveform due to an electrostatic capacitance between electrodes of the electron gun and the resistor, 'a' represents a constant determined by the electrostatic capacitance between electrodes, 'f' represents the frequency of a dynamic focus voltage, 'h' represents the amplitude of the dynamic focus voltage, 'R' represents the resistance of the resistor, and 'V' represents the dynamic focus voltage.

Figure 5:
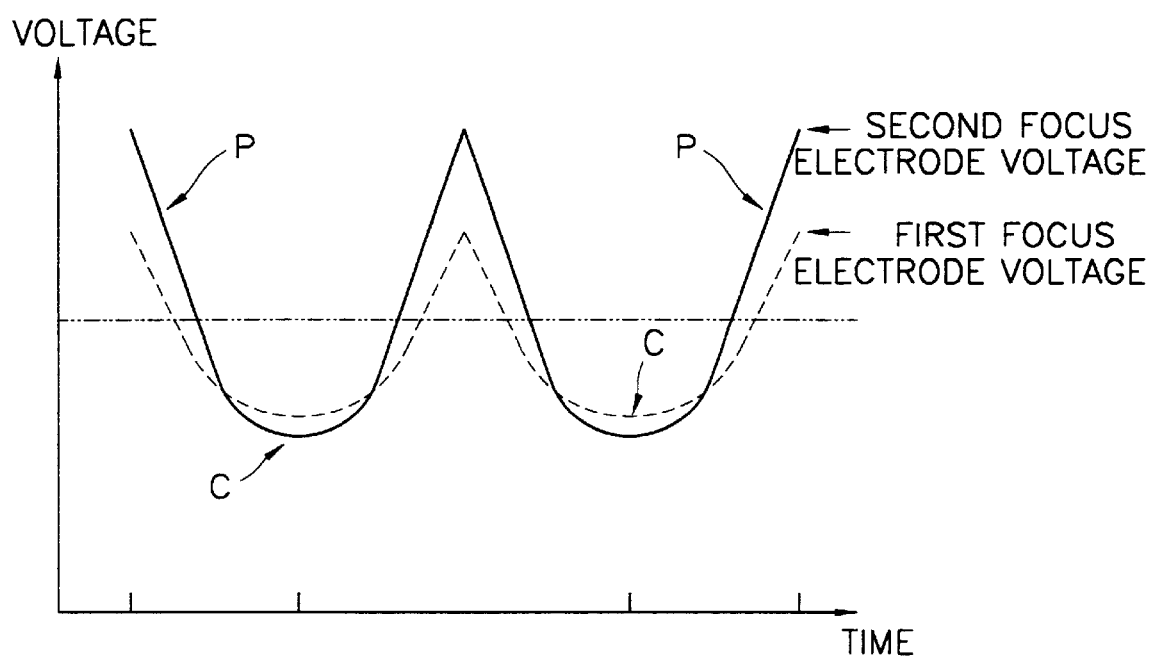
FIG. 5 is a graph showing voltages applied to first and second focus electrodes of FIG. 4.

As shown in the above expression, as the amplitude of the applied focus voltage increases, the AC voltage according to the resistance is more reduced. That is, when electron beams are deflected to a peripheral portion of the screen, the amplitude of the applied dynamic focus voltage increases, and the voltage drop increases due to the resistor 101 and the electrostatic capacitance between the first and second focus electrodes 54 and 55. As shown in FIG. 5, the difference in voltages applied to the first and second focus electrodes 54 and 55 in a center portion 'C' of a fluorescent film is smaller than that applied to the first and second focus electrodes 54 and 55 when the electron beam is incident on a peripheral portion 'P' of the fluorescent film.

Accordingly, in a dynamic focus lens, as the deflection of the electron beams increases, the voltage difference between the first and second focus electrodes 54 and 55 increases. Here, electron beam passing holes (not shown) in the first and second focus electrodes 54 and 55 are vertically and horizontally elongated, so that the electron beams, during deflection, are vertically diverged and horizontally focused, to enhance focus characteristics.

According to the electron gun device of the present invention, since the resistor connected between the first and second focus electrodes is located outside the cathode ray tube, the resistor may be easily replaced. Also, since the resistor may be a rheostat, the AC voltage applied to the electrode for forming the lens may be easily controlled according to driving conditions of the electron gun.

Also, although high current surges may flow through the resistor, the resistor is connected to the capacitance so that damaged to the resistor may be prevented.

The electron gun device of the present invention may be employed as a cathode ray tube for a monitor or a television.

It should be understood that the invention is not limited to the illustrated embodiment and that many changes and modifications can be made within the scope of the invention by a person skilled in the art.

What is claimed is:

1. A cathode ray tube assembly comprising:
   a cathode ray tube including
      a funnel having a neck,
      an electron gun sealed within the neck of the funnel and having an electron emitter, and at least first and second focus electrodes for forming an electron lens for focusing and accelerating electrons emitted by the electron emitter, and
      first and second lead pins respectively connected to the first and second focus electrodes and extending through the neck outside the cathode ray tube;
   a socket mountable on the first and second lead pins and having first and second pin connection terminals for respectively applying voltages to the first and second focus electrodes through the first and second lead pins;
   a voltage applying unit for applying an AC voltage to the first focus electrode through the first lead pin connected to the first focus electrode; and
   at least one voltage drop unit for reducing the AC voltage supplied by the voltage applying unit and for applying the AC voltage so reduced to the second lead pin connected to the second focus electrode, the voltage drop unit being connected between the first and second lead pins connected to the first and second focus electrodes through the first and second pin connection terminals of the socket connected to the first and second lead pins.

2. The cathode ray tube assembly of claim 1, wherein the voltage applying unit comprises:
   a rectifier for transforming alternating current into direct current;
   a condenser for removing high frequency noise from the direct current;
   a voltage divider for dividing a voltage across the condenser; and
   a dynamic voltage generator for applying an AC voltage, synchronized with a voltage applied to a deflection yoke, to the voltage divided by the voltage divider.

3. The cathode ray tube assembly of claim 2, wherein the voltage drop unit is a resistor for reducing the voltage divided by the voltage divider and to which the AC voltage is applied by the dynamic voltage generator.

4. The cathode ray tube assembly of claim 3, wherein the voltage drop unit is a rheostat.

5. The cathode ray tube assembly of claim 1, wherein the voltage drop unit is a rheostat.

* * * * *